Patented Apr. 20, 1954

2,676,102

UNITED STATES PATENT OFFICE 2,676,102

PHOTOGRAPHIC FILM

Thomas Boyd and Robert E. Cairns, Springfield, and Charles Kilbourne Bump, Hampden, Mass., assignors to Monsanto Chemical Company, St. Louis, Mo., a corporation of Delaware No Drawing. Application September 15, 1950, Serial No. 185,148

7 Claims. (Cl. 95—8)

This invention relates to photographic film and prints. More particularly, the invention relates to a new subbing film for promoting the adhesion of gelatin to photographic film and prints.

One of the major problems of the photographic industry is to provide a subbing film which will cause gelatin to adhere to the base material used in films and prints. The subbing film must be strongly adherent to both the film or paper and to the gelatin.

One object of this invention is to provide a subbing film for photographic films and prints.

A further object is to provide a photographic film having gelatin firmly bonded to the film by a new subbing layer.

Another object is to provide photographic printing paper in which the gelatin is firmly bonded to the paper.

These and other objects are attained by applying a layer of condensation polymer of titanium or a copolymer thereof with certain organo silanes to photographic film or printing papers and thereafter applying a coating of gelatin.

The following examples are given in illustration and are not intended as limitations on the scope of this invention. Where parts are mentioned they are parts by weight.

Example I

A cellulose acetate base film is passed slowly through a 0.1% solution of polymeric tetrabutyl ortho titanate in xylene. The rate of the passage of the film through the solution is adjusted to deposit on the film a layer of titanium polymer about 0.5 mil thick. The coating is freed from solvent, subjected to a stream of moist air for a few minutes and then coated with gelatin from an aqueous solution thereof. The water is removed from the gelatin to provide a smooth transparent composite film. After the drying process, it is found quite difficult to remove the gelatin layer by scraping it even under humid conditions.

Example II

Paper for photographic prints is coated on one side with a layer of about 1.0 mil thickness of a condensation polymer of tetrastearyl ortho titanate from a 1% solution of the polymer in benzene. The film is dried and then subjected to humid conditions for about 5 minutes. Gelatin is applied to the coated side of the paper from aqueous solution and then dried to remove water. A strongly adherent gelatin coating is obtained. The composite paper thus made shows superior adhesion of the gelatin coating but like most of the commercially available photographic printing paper shows a tendency to curl. This may be eliminated and a permanently flat printing paper may be obtained by coating both sides of the paper with the titanium polymer. The subbing film in either case may be from 0.1 to 1.0 mil in thickness.

Example III

Photographic printing paper is roll-coated on both sides with a copolymer of tetrabutyl ortho titanate and tetrabutoxy silane. The copolymer is prepared by reacting 0.5 mol of the titanate with 0.5 mol of the silane and 0.8 mol of water in solution in anhydrous butanol. After the polymerization is complete, more anhydrous butanol is added to obtain a 1% solution by weight. This is the solution used to roll-coat the paper. After the coating operation, the solvent is removed by gentle heating and the coating which is about 0.3 mil thick is subjected to a stream of humid air for about 5 minutes. Thereafter, gelatin is applied to one of the coated surfaces from an aqueous solution and the solvent is driven off. The removal of the gelatin by chemical or physical means is quite difficult. After printing and developing the print, followed by the usual washing and drying process, a completed print is obtained which does not curl.

Example IV

A cellulose acetate film base is coated with about 0.1 mil layer of a condensation polymer of titanium tetraphthalate from a xylol-butanol solution. The coating is applied to only one side of the film. The coating is freed from solvent and then subjected to a humid atmosphere for about 5 minutes. Thereafter, a layer of gelatin is applied to the coated side of the film from an aqueous solution. After the water is removed from the gelatin it can be removed from the coated film only with great difficulty by mechanical means.

The condensation polymer films of this invention must be applied from anhydrous solvents. After the coating is in place, the solvents are removed by evaporation at room temperature or at slightly elevated temperatures and the residual polymer coating is exposed to a humid atmosphere. For quickest results, a stream of warm air having a relative humidity of over 50% may be used but mere exposure to air at atmospheric temperature and having a relative humidity of about 30% will accomplish the curing of the coating. The coating may have a thickness of from 0.1 to 1.0 mil and this thickness is water-white and transparent. The coating cannot be removed from the film or the paper by physical or chemical means without seriously damaging the film or paper.

The titanium polymers of this invention are condensation polymers of organic derivatives of titanium which are prepared by reacting monomeric organic derivatives of titanium with from 0.5 to 1.0 mol of water per mol of titanium compound under otherwise anhydrous conditions. The polymers and the process of making them are described and claimed in co-pending patent application Serial No. 122,844 filed October 21, 1949, in the name of Thomas Boyd.

Among the titanium organic compounds which may be polymerized are the tetra esters of ortho titanic acid including the methyl, ethyl, propyl, isopropyl, butyl, isobutyl, secondary butyl, tertiary butyl, pentyl, octyl, iso-octyl, 2-ethyl hexyl, decyl, lauryl, stearyl, eicosanyl, etc. saturated aliphatic esters, the allyl, ethallyl, methallyl, crotonyl, oleyl, vinyl, etc. ethylenically unsaturated aliphatic esters, the phenyl, cresyl, xylyl, resorcinyl, naphthyl, etc. aromatic esters. The organic groups may contain inorganic substituents such as halogen, nitro, sulfone, etc. groups.

A second class of titanium organic derivatives which may be polymerized are the mixed anhydrides of ortho titanic acid and organic acids. These compounds are sometimes called esters of the organic acid with the ortho titanic acid since the latter is amphoteric in character and may react as an alcohol. Among the mixed anhydrides which may be used are the tetraacetate, tetrapropionate, tetrabutyrate, tetraisobutyrate, tetralaurate, tetrastearate, tetraoleate, tetrabenzoate, tetranaphthalate, tetracinnamoate, etc. Substituents such as halogen, nitro groups, amino groups, etc. may be present.

A third class of titanium organic derivatives which may be used is the amides of ortho titanic acid. These include the amides such as methyl amide, butyl amide, decyl amide, palmityl amide, oleyl amide, cetyl amide, phenyl amide, benzyl amide, naphthyl amide, etc., of ortho titanic acid.

The organic derivatives of metal titanic acid may also be polymerized to yield polymers useful in this invention.

The condensation polymers range from crystal clear viscous fluids to white waxy solids. They are soluble in substantially anhydrous organic solvents such as alcohols, hydrocarbons, ketones, etc. The polymers may be formed by adding the requisite amount of water slowly to the anhydrous titanium monomer with constant agitation. However, for ease of working, the polymerization is carried out in an anhydrous solvent which may be advantageously an excess of the compound used to make the monomer. The polymer prepared in the solvent medium is then used in the form of a solution without freeing it from the solvent.

The copolymers of organo titanium compounds and organo silanes are disclosed and claimed in co-pending patent application Serial No. 151,819 filed March 24, 1950 in the name of Thomas Boyd, now abandoned. These copolymers are prepared by condensing the monomeric titanium organic compound set forth above with silicon compounds which have the formula $R_3SiX$ wherein the X is halogen, hydroxyl, or OR', and R is halogen, OR' or an organic radical, and R' is an organic radical. The organic radicals may be cyclic or acyclic, saturated, unsaturated or aromatic and include the alkyl, aryl, alkenyl, aralkyl, aralkenyl, alkenaryl, cycloalkyl, cycloalkenyl, and heterocyclic radicals such as methyl, ethyl, propyl, butyl, isobutyl, secondary butyl, tertiary butyl, amyl, hexyl, vinyl, allyl, chlorallyl, methallyl, crotyl, butadienyl, phenyl, dichlorophenyl, pentachlorophenyl, etc., radicals. However, the saturated hydrocarbon radicals are generally preferred.

The preparation of the copolymers is carried out in anhydrous solvents such as anhydrous alcohols, anhydrous aliphatic hydrocarbons or anhydrous aromatic hydrocarbons. Preferably, the solvent should have a relatively low boiling point so that it may be removed from the reaction product without heating to over 200° C. It is frequently desirable to conduct the distillation under vacuum to remove the solvent.

The copolymerization reaction is dependent upon the amount of water added. The water should be added slowly to a solution of the monomers or the monomer mixture should be added slowly to the water dispersed in a miscible solvent. The entire amount of water should not be mixed with the entire amount of comonomers at one time. The amount of water may be varied from 0.5 mol to 1.5 mols per mol of monomer mixture.

The copolymers range from liquids to hard solids depending on the particular monomers and the amount of water used. In general, if 0.5 mol of water is used, the products are simple copolymers containing one molecule of each of the monomeric components. As more water is used, the molecular weight and the number of titanium and silicon units in the copolymer rises with the production of long chain polymeric materials which are increasingly viscous. When the amount of water is from 1.0 to 1.5 mols, substantial crosslinking occurs and the majority of the products are solids. For some purposes, it is desirable to produce a copolymer of low molecular weight from a silicon derivative having at least two reactive radicals such as diphenyl dihydroxy silane and then to add a little more water and a silane having only one reactive position such as triphenyl silicon hydroxide. This procedure results in a terpolymer in which the chains are terminated by the triphenyl silane radical.

The subbing layers of this invention may be applied to any of the conventional photographic backing materials such as paper, cellulose acetate films, cellulose nitrate films, vinylidene resin films, etc. They strongly adhere to both porous and non-porous types of backing surfaces.

The subbing layers of this invention make it possible to produce photographic film and printing papers to which the gelatin layer is firmly adherent and cannot be easily removed by physical means such as frequently occurs in rough handling of the materials. Since the subbing layers are clear, transparent and colorless, they do not interfere with the reproduction qualities of the film or paper. The subbing layers have the additional advantage that they can be used to prevent the curling of developed prints.

It is obvious that many variations may be made in the products and processes of this invention without departing from the spirit and scope thereof as defined in the appended claims.

What is claimed is:

1. A photographic film comprising a backing sheet, a subbing layer on said backing sheet and a light sensitive gelatin emulsion layer on said subbing layer, said subbing layer consisting essentially of a film of a condensation polymer taken from the group consisting of condensation polymers of monomeric tetraorgano derivatives of orthotitanic acid and copolymers thereof with monomeric organo silanes, said condensation polymer having been prepared by reacting one mol of said monomer or monomer mixture with from 0.5 to 1.5 mols of water under otherwise anhydrous conditions, said condensation polymer having been formed by adding said water slowly and with constant agitation.

2. A composite as in claim 1 wherein the polymer is a polymer of a tetraalkyl ortho titanate.

3. A composite as in claim 2 wherein the tetraalkyl ortho titanate is tetrastearyl ortho titanate.

4. A composite as in claim 2 wherein the tetraalkyl ortho titanate is tetrabutyl ortho titanate.

5. A composite as in claim 1 wherein the polymer is a copolymer of an organic derivative of titanium and an organo silane.

6. A composite as in claim 5 wherein the copolymer is a copolymer of tetrabutyl ortho titanate and tetrabutoxy silane.

7. A photographic film as in claim 1 wherein a subbing layer is on both sides of the backing sheet and wherein the light sensitive gelatin emulsion layer is on one of said subbing layers.

References Cited in the file of this patent

UNITED STATES PATENTS

| Number | Name | Date |
|---|---|---|
| 2,258,718 | Rothrock | Oct. 14, 1941 |
| 2,467,177 | Zimmer | Apr. 12, 1949 |
| 2,512,058 | Gulledge | June 20, 1950 |

OTHER REFERENCES

Kraitzer et al., Journal Oil and Color Chemists' Assn., vol. 31, No. 340, 1948, pp. 405–409.